June 30, 1931.  W. D. LA RUE  1,812,348
STROBOSCOPIC TESTING SYSTEM AND APPARATUS
Filed June 14, 1928
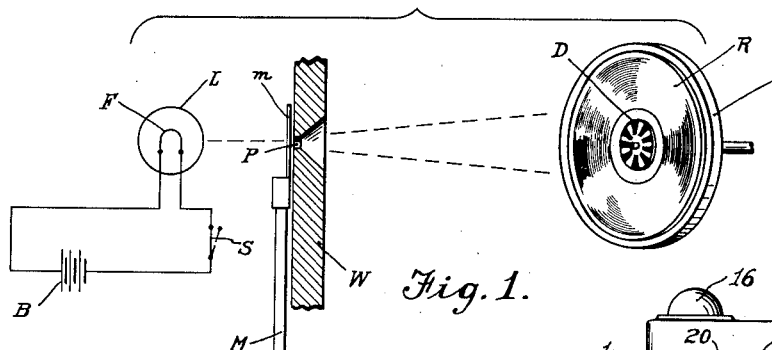
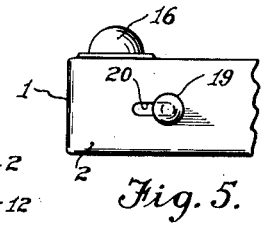
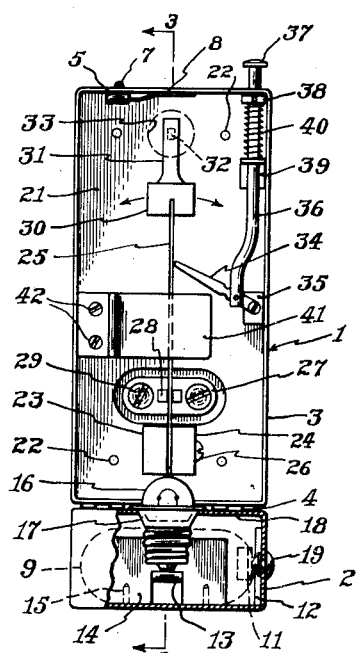
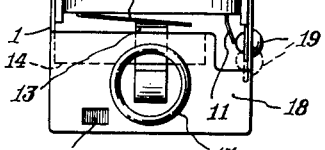
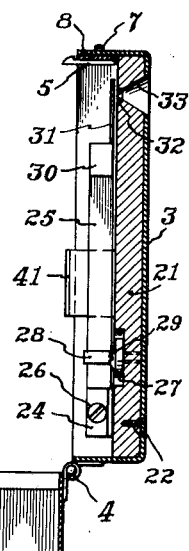
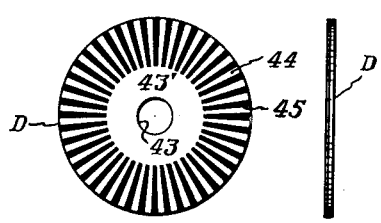
William D. La Rue
INVENTOR
BY Lyman D. Oberlin
ATTORNEY
WITNESS:
John Babis, Jr.

Patented June 30, 1931

1,812,348

UNITED STATES PATENT OFFICE

WILLIAM D. LA RUE, OF MAPLE SHADE, NEW JERSEY, ASSIGNOR TO VICTOR TALKING MACHINE COMPANY, A CORPORATION OF NEW JERSEY

STROBOSCOPIC TESTING SYSTEM AND APPARATUS

Application filed June 14, 1928. Serial No. 285,380.

My invention relates to a stroboscopic testing system and comprehends a method of and apparatus for ascertaining or checking the speed of a movable or rotatable member such, for example, as the turntable of a phonograph or talking machine.

In accordance with my invention, a beam of light is passed into coacting relation with spaced indicia movable with a member or surface, as aforesaid, the light beam being periodically interrupted to stroboscopically indicate the speed of said member or surface.

Further in accordance with my invention, a beam of light, as aforesaid, is produced, or generated, by or in response to the passage of electrical current through the filament of an incandescent lamp and, for interrupting said beam of light, there is utilized spring mechanism suitably arranged to vibrate at a proper and desired frequency.

Further in accordance with my invention, there is provided a portable stroboscopic testing unit comprising a plural-part casing, one of the parts containing an incandescent lamp and its actuating cell or battery, another of said parts containing mechanism for periodically interrupting a beam of light emanating from said incandescent lamp.

My invention resides in the method, system, apparatus and features of construction of the character hereinafter described and claimed.

For an understanding of my method and for an illustration of one of the forms my system or apparatus may take, reference is to be had to the accompanying drawings, in which:

Figure 1 is a diagrammatic view of a testing system constructed in accordance with my invention.

Fig. 2 is an end view of the stroboscopic testing unit illustrated in Figure 3, parts being broken away.

Fig. 3 is a vertical sectional view, taken on the line 3—3 of Figure 2 and looking in the direction of the arrows.

Fig. 4 is a plan view of a part of the structure shown in Figure 3.

Fig. 5 is a side view of the structure shown in Figure 4.

Figs. 6 and 7 are, respectively, side and end elevational views of a stroboscopic disk.

Referring to Figure 1, there is illustrated a stroboscopic system comprising a source of light L of any suitable character such, for example, as a bulb containing a filament F adapted to be brought to incandescence by current passing therethrough from a battery B included in a circuit connected to the terminal of said filament F, said circuit usually including a suitable switch S. Alternatively, the source of light L may be energized otherwise than as described so long as the light-emitting element emits light constantly in a non-interrupted manner.

A light beam passing from the filament F traverses a passage or slot P in a light-opaque wall or member W and coacts with or impinges upon a sectored disk or member D carried by or movable with a movable or rotating member, the speed of which is desired to be checked or observed. In the example shown, disk D is carried by a phonograph record R of a type well known to the art which, in turn, is supported by a turntable T.

In practice, it is desirable that a phonograph record R should rotate at some arbitrarily selected speed, for example, seventy-eight or eighty revolutions per minute and to the end that the rotative speed of said record R may be readily determined, the arrangement illustrated in Figure 1 may be utilized. As shown, the disk D, on its outer or upper face, comprises alternate dark and light radially-extending sections and these sections are illuminated by the light beam emanating from the filament F and passing through the slot P.

Accordingly, by properly selecting the number of alternate dark and light sections, as aforesaid, and by periodically and regularly interrupting the aforesaid light beam the proper number of times per minute, the dark sections of the disk D, due to the well known stroboscopic effect, will appear to remain stationary when said disk D is rotating at a certain speed and, obviously, this speed may be that mentioned above as one which is arbitrarily selected. In the example shown, the light beam passing to the disk D is interrupted by a member M movable transversely with respect thereto, said member M comprising a light-obstructing extension m movable across the light path extending from the filament to the disk D by way of the passage P. Preferably, member M is disposed between the light source L and wall W, and closely adjacent to the latter. Member M may be actuated by any suitable mechanism, not shown, to cause its extension m to sweep past the slot P the proper number of times per minute.

Referring to Figures 2, 3, 4 and 5, there is illustrated a form of my invention in which there is provided a portable casing containing an incandescent lamp, a battery, and a vibratory member for periodically interrupting the light beam emanating from said lamp.

As shown, the container 1 comprises a pair of metallic sections, receptacles or containers 2 and 3 hinged together at 4, said sections being movable toward and into engagement with each other. In this position, the sections 2 and 3 are in closed position and they are so held by a latch 5 carried by the section 3 and having a part cooperating with an opening 6 in the section 2. Latch 5 comprises an actuating knob 7 and is supported by a resilient member 8 carried by said section 3.

Disposed within the receptacle 2 is a low-voltage cell or battery 9 having resilient contact members or terminals 10 and 11. Ordinarily, strips 12, 12 of suitable insulating material, as hard rubber or a phenol condensation product, are disposed between the cell 9 and the receptacle or section side walls.

The terminal 10 conductively engages one end of a resilient contact member 13 supported mid-way of its ends by a member 14 up-standing from the bottom of receptacle 2, Figures 2 and 3, and secured thereto in any suitable manner as by screws 15. The free end of contact member 13 removed from the cell 9 is bent upon itself and engages the bottom of an incandescent lamp bulb 16 threaded into and through a socket 17 conductively related to and depending from a ledge or shelf portion 18 formed integrally with the receptacle 2.

The terminal 11 conductively engages the conducting knob or terminal of a switch 19 which comprises a stem slidable in a slot 20, Figures 4 and 5.

The switch 19 is grounded upon the receptacle 2 and, when in the position shown by the full lines of Figure 4, a circuit is completed from contact 11 of cell 9, by way of switch 19, the wall structure of receptacle 2, shelf 18, socket 17, one terminal of the filament within the bulb 16, the filament itself, the other terminal of said filament, contact member 13, and thence to contact 10. For this position of switch 19, the filament is traversed by electrical current and brought to incandescence. When switch 19 is in the position shown by the broken lines of Figure 4, the aforesaid circuit is open and the filament is not traversed by electrical current.

As illustrated in Figures 2 and 3, the receptacle 3 interiorly thereof and adjacent its rear wall, contains a plate 21 of substantial thickness and secured thereto by screws 22, or the like. Projecting from the plate 21 and preferably formed integrally therewith is a lug or member 23, Figure 2, between which and a block 24 one end of a spring stem, reed, or member 25 is secured, a screw 26, or equivalent, passing through the block 24, stem 25 and lug 23 to positively clamp the parts in position.

Disposed in a recess formed in the plate 21 is the base 27 of a member 28 projecting laterally from said plate 21 to which the aforesaid base 27 is secured in any suitable manner, as by screws 29. The member 28 is slotted in a direction extending longitudinally of the receptacle 3 and the spring stem 25 extends through this slot.

At its upper or free end, the spring stem 25 carries an inertia member or weight 30 from which, in alinement, with said stem 25, the light-obstructing extension or member 31 extends.

The plate 21 comprises a passage or slot 32 merging into a cone-shaped passage 33 which likewise merges into a similar passage formed in the rear wall of receptacle 3.

An actuating member 34, Figure 2, pivoted to a block 35 suitably secured to the plate 21 is arranged for operation of the spring stem 25. A rod 36 pivoted to the member 34 extends longitudinally with the receptacle 3, through its upper wall, and has an actuating knob 37 disposed exteriorly thereof. Interiorly of the receptacle 3, a collar 38 is secured to and moves with the rod 36. A member 39 secured to the plate 21 comprises a portion through which the rod 36 passes. Confined between the collar 38 and member 39 is a helical spring 40 which biases the rod 36 in an upward direction, Figure 2.

If desired, a bracket 41 secured to the plate 21 by screws 42 or the like, may extend slightly beyond the walls of the receptacle 3, Figure 3. When the two receptacles are closed upon each other, the bracket 41 engages the cell 9 and securely holds it in the proper position.

Referring to Figure 2, the openings receiving the screws 29 are shown by the broken lines as being substantially greater in diameter than the shanks of said screws 29. Due to this construction, the member 28 may be shifted longitudinally of the spring member 25 to suitably adjust or control the natural period of the latter.

Referring to Figures 6 and 7, there is illustrated one form of stroboscopic disk D which may be utilized in accordance with my invention. As shown, disk D is generally plane and circular. It comprises a centrally disposed opening 43 surrounding a light portion 43′, in turn, surrounded by alternate light and dark radially extending marks or indicia 44 and 45. In the example illustrated, there should be ninety-two of the aforesaid light and dark indicia 44 and 45. This is approximately the correct number to produce the stroboscopic effect upon rotation of disk D at seventy-eight revolutions per minute when it is illuminated by alternating current having a frequency of sixty cycles per minute. This follows because an electric lamp energized by current of that frequency produces $2 \times 60 \times 60 = 7200$ light impulses per minute. Therefore, the correct number of indicia for seventy-eight revolutions per minute is $7200 \div 78 = 91.0+$.

Since a prominent feature of my invention involves the utilization of an electric lamp energized by direct rather than alternating current together with an arrangement for interrupting the light beam emanating from said lamp, it follows from the foregoing that the herein-described member M, spring 25, or equivalent, must be designed or controlled that approximately 7200 light impulses are produced per minute when the stroboscopic effect is to be present on a sectored disk of the kind illustrated in Fig. 6 when rotating at seventy-eight revolutions per minute.

When my invention simulates the form shown in Figs. 2 and 3, the spring member 25 and its inertia member 30 are designed with the aforesaid end in view. Compensation may be effected for any slight variation from the desired rate of vibration by adjusting the member 28 in the proper direction longitudinally of the spring member 25.

It is well understood that the frequency of vibration of a spring member is independent of its amplitude of vibration and hence the rate of vibration of spring member 25, as imposed by the actuating member 36, or equivalent, is independent of the amplitude of oscillation of said spring member 25.

A prominent feature of my invention resides in the fact that at frequent intervals substantially the instantaneous speeds of the rotating member may be observed and, from the data thus obtained, a curve may be plotted to show the performance over an extended period of the motor or other actuating mechanism for the aforesaid rotating member. This follows because vibration of the spring member 25, in response to one operation of the member 36, usually persists for only a very short time, as a second or two and during this short period an observation may be taken as stated above.

I claim as my invention:

1. A portable stroboscopic testing unit comprising a casing including a plurality of hinged receptacles, a dry cell and an incandescent lamp disposed in one of said receptacles, the wall structure of another of said receptacles having a slot traversed by a beam of light emanating from said incandescent lamp, and means comprising a spring reed mounted in one of said receptacles for periodically interrupting said beam of light.

2. A portable stroboscopic testing unit comprising a casing including a plurality of hinged receptacles, a dry cell and an incandescent lamp disposed in one of said receptacles, a plate disposed in another of said receptacles, said plate and the wall structure of said other of said receptacles having a slot traversed by a beam of light emanating from said incandescent lamp, and means comprising a spring reed mounted on said plate for periodically interrupting said beam of light.

3. A portable stroboscopic testing unit comprising a casing including a plurality of hinged receptacles, a dry cell and an incandescent lamp disposed in one of said receptacles, the wall structure of another of said receptacles having a slot traversed by a beam of light emanating from said incandescent lamp, means comprising a spring reed mounted in one of said receptacles for periodically interrupting said beam of light, and means for actuating said spring reed.

4. In a device of the class described, the combination of a casing, a light source therein, said casing having an aperture through which light rays from said source pass, an opaque member between said source and said aperture, means for oscillating said member across the path of said rays comprising a spring mounted on said casing and carrying said member, means for oscillating said spring, and means for adjusting the period of oscillation of said spring comprising a member secured to said casing and operatively engaging said spring, said last named member being adjustable on said casing longitudinally of said spring.

5. In a device of the class described, the combination of a casing, a light source therein, said casing having an aperture through which light rays from said source pass, an opaque shield between said source and said aperture, a spring mounted on said casing and carrying said shield, a manually operable lever adapted to engage said spring to set the same into oscillation, and means for adjusting the period of oscillation of said spring.

6. In a device of the class described, the combination of a casing, a lamp and a battery therefor mounted in said casing, said casing having an aperture through which light rays from said lamp pass, an opaque shield between said lamp and said aperture, a spring mounted at one end on said casing and carrying said shield on its other end, said shield having sufficient weight to constitute an inertia member for said spring, and a manually operable lever adapted to engage said spring intermediate its end to initiate oscillation thereof.

In testimony whereof I have signed this specification this 18th day of May, 1928.

WILLIAM D. LA RUE.